United States Patent [19]

Futakuchi et al.

[11] E Patent Number: Re. 32,582

[45] Reissued Date of Patent: Jan. 26, 1988

[54] CYLINDER HEAD FASTENING STRUCTURE FOR INTERNAL COMBUSTION ENGINES

[75] Inventors: Yorio Futakuchi, Shizuoka; Nobuaki Oshiro, Hamamatsu, both of Japan

[73] Assignee: Yamaha Hatsudoki Kabushiki Kaisha, Japan

[21] Appl. No.: 738,376

[22] Filed: May 28, 1985

Related U.S. Patent Documents

Reissue of:

[64] Patent No.: 4,430,968
Issued: Feb. 14, 1984
Appl. No.: 363,636
Filed: May 7, 1982

[30] Foreign Application Priority Data

Mar. 31, 1981 [JP] Japan ..... 56-48968

[51] Int. Cl.[4] ..... F01L 1/46

[52] U.S. Cl. ..... 123/90.27; 123/193 H; 123/90.34

[58] Field of Search ..... 123/90.27, 90.34, 193 H, 123/195 C, 193 CH

[56] References Cited

U.S. PATENT DOCUMENTS

| | | | |
|---|---|---|---|
| 3,022,775 | 2/1962 | Bouvy | 123/193 H |
| 3,400,695 | 9/1968 | Zaruba | 123/90.27 X |
| 3,477,417 | 11/1969 | Moulin | 123/90.27 |
| 3,521,613 | 7/1970 | Celli | 123/90.27 X |
| 3,672,338 | 6/1972 | Yamanouchi | 123/90.27 |
| 3,875,908 | 4/1975 | Ayres | 123/90.27 X |

FOREIGN PATENT DOCUMENTS

| | | | |
|---|---|---|---|
| 1134677 | 11/1968 | United Kingdom | 123/90.27 |

*Primary Examiner*—William R. Cline
*Assistant Examiner*—Peggy A. Neil
*Attorney, Agent, or Firm*—Ernest A. Beutler

[57] ABSTRACT

An improved cylinder head fastening arrangement for an internal combustion engine that permits location of overhead cam shafts directly over the cylinder head fasteners. The cam shafts are formed with access openings that extend through them which permit a tool to be passed for tightening of the cylinder head fasteners without removal of the cam shaft.

31 Claims, 2 Drawing Figures

CYLINDER HEAD FASTENING STRUCTURE FOR INTERNAL COMBUSTION ENGINES

Matter enclosed in heavy brackets [ ] appears in the original patent but forms no part of this reissue specification; matter printed in italics indicates the additions made by reissue.

BACKGROUND OF THE INVENTION

This invention relates to a cylinder head fastening structure for an internal combustion engine and more particularly to an improved engine layout for an overhead cam shaft engine that facilitates servicing.

As is well known, the cylinder head of an engine is normally fixed to the cylinder block either by means of bolts or by means of studs and nuts. When the engine embodies one or more overhead cam shafts, the relative positioning between the cam shafts and the head fasters often results in compromise of the placement of either or both. For example, it is desirable to position the overhead cam shaft directly above the cylinder bore so that the valves can be located relative to the cylinder so as to insure good volumetric efficiency and breathing. However, it is also desirable to locate the cylinder head fastener in the same location. When both the cam shaft and cylinder head fastener are so located, servicing has been a problem with the prior art type of constructions. That is, retorqueing of the cylinder heads after a rebuild will necessitate removal of the cam shafts. To avoid these problems, it has been proposed to offset the cam shafts from a position over the cylinder bores, thus resulting in a less than optimum placement. The problem is particularly acute when two overhead cam shafts are employed. It is desirable to position the cam shafts as close as possible to each other to insure good valve placement in the cylinder and also so as to reduce the necessity for using interconnecting motion transmitting mechanism between the cam lobes and the valve stems. With prior art fastening arrangements, however, such close position has been impossible unless serviceability is sacrificed.

It is, therefore, a principal object of this invention to provide an improved fastening arrangement for the cylinder head of an internal combustion engine.

It is a further object of the invention to provide an improved cam shaft and cylinder head fastening arrangement for an overhead can shaft engine.

SUMMARY OF THE INVENTION

This invention is adapted to be embodied in a construction for an overhead cam internal combustion engine that comprises a cylinder head that is adapted to be affixed to another component of the engine by at least one fastener. In accordance with the invention, a cam shaft is journaled for rotation relative to the cylinder head and is positioned in overlying relationship to the fastener. Means define an access opening passing through the cam shaft and adapted to pass a tool for tightening the fastener without removal of the cam shaft.

DETAILED DESCRIPTION OF PREFERRED EMBODIMENT

Figure 2:
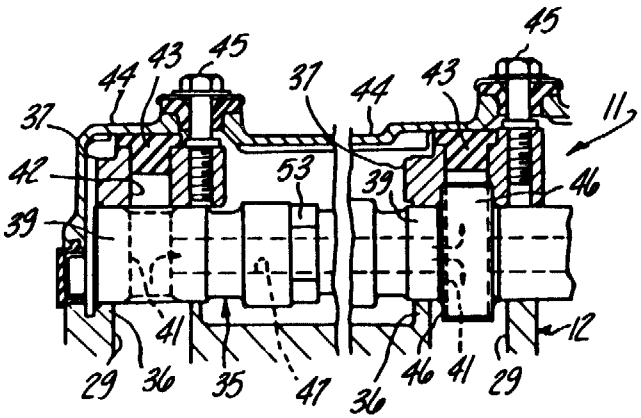
FIG. 2 is a cross-sectional view taken along the line 2—2 of FIG. 1.

In the drawings an overhead cam shaft internal combustion engine constructed in accordance with this invention is identified generally by the reference numeral 11. The engine 11 includes a cylinder head, indicated generally at 12; a cylinder block, indicated generally at 13; and a crankcase, indicated generally at 14. The cylinder head 12, cylinder block 13 and crankcase 14 are held together with a fastening arrangement constructed in accordance with the invention. The fastening arrangement includes a series of spaced studs, indicated generally at 15, and nuts, indicated generally by the reference numeral 16. The lower ends of the studs 15 are each formed with a male threaded portion 17 that is threaded into a respective tapped opening 18 formed in the crankcase 14. The central portion of each of the studs 15 is relieved, as at 18, and extends through aligned appertures 19 and 21 in the cylinder block 13 and cylinder head 12, respectively. At least some of the appertures in the cylinder block 13 and crankcase 14 through which the studs 15 pass are formed with respective counterbores 22 and 23. Pilot bushings 24 are received within these counterbores so as to locate the cylinder block 13 and crankcase 14. In a like manner, at least some of the bores which pass the studs 15 of the cylinder head 12 and cylinder block 13 are formed with respective counterbores 25 and 26 for receiving pilot bushings 27 to locate these elements.

The upper ends of the studs 15 are formed with male threads 28 that extend into the lower portion of bores 29 which, in turn, form extensions of the cylinder head bores 21. The bores 29 extend upwardly through cam shaft towers 31 formed integrally with the cylinder head 12. The nuts 16 have internal threads 32 that are received on the stud threads 28. The nuts 16 engage washers 33 and serve to affix the cylinder head 12 relative to the cylinder block 13 and the crankcase 14. The heads of the nuts 16 are formed with hexagonal socket openings 34 so as to facilitate tightening of the nuts 16, in a manner to be described.

A cam shaft, indicated generally by the reference numeral 35, is supported in each of the cam towers 31. The cam shafts 35 are journaled by spaced bearings 36 that are formed integrally with the cylinder head 12. Bearing caps 37 are affixed at spaced locations to the cylinder head by bolts 38 and cooperate with the bearings 36 to rotatably journal the cam shafts 35. One cam shaft 35 may operate the intake valves in a known manner while the other cam shaft 35 may operate the exhaust valves in a known manner. Preferably the lobes of the cam shafts 35 cooperate either directly with the stems of the intake and exhaust valves or with some suitable follower that will afford lash adjustment.

The cam shaft 35 has cylindrical portions 39 that are journaled in the cylinder head cam shaft bearing portions 36 and the bearing caps 37. The cylindrical portions 39 overlie the nuts 16 and, therefore, with conventional constructions it would be necessary to remove the cam shafts 35 before the nuts 16 could be tightened, retightened or removed. In accordance with this invention, however, each bearing portion 39 of the cam shaft 35 that overlies a nut 16 is formed with an access opening 41 that is sized to pass a tool such as a key wrench configured to cooperate with the nut socket openings 34. In a like manner, the bearing caps 37 are also formed with access opening 42. The bearing cap access openings 42 are normally closed by means of plugs 43. The plugs 43 are maintained in sealing engagement with the cap openings 42 by means of a cam cover 44 that encloses the cam tower 31. The cam covers 44 are affixed to the respective cam towers 31 by means of bolts 45 that are received in tapped openings in the bearing caps 37.

One of the cylindrical bearing portions 39 of the cam shaft 35 is formed with an enlarged cylindrical projection 46. The adjacent cylinder head bearing surface 36 and bearing cap 37 is formed with a complimentary recess so that the projection 46 and these recesses will serve to provide thrust location for the cam shaft 35.

In addition to permitting tightening of the head 12 to the block 13 and crankcase 14, the access holes 41 in the cam shafts 35 may be used to facilitate lubrication of the valve train and specifically the bearing surfaces provided by the cam bearing portions 39. For this purpose, each cam shaft is provided with a longitudinally extending oil passage 47 that intersects the access holes 41. Oil under pressure is delivered from the crankcase 14 through an oil pump (not shown) to a suitable passage that intersects the area between one of the studs 15 and the locating bushing 24. The pressurized oil will then flow upwardly around this stud 15 through the clearance provided between its unthreaded portion 18 and the bores 19 and 21. When this oil reaches the cylinder head 12, it will flow into a cross-drilled passageway 48 that extends transversely across the cylinder head 12 and which intersects the bore 29 which surrounds the nuts 16 associated with the cam shaft 35 on the opposite side of the cylinder head 12. The outer end of the cross-drilled passageway 48 is closed by means of a closure plug 49. Another cross-drilled passage 51 extends through the cylinder head 12 from an area outwardly of the nut 16 associated with the stud 15 through which the pressurized oil is delivered. The passageway 51 intersects the cross-drilled passageway 48 approximately at its center and its outer end is closed by a plug 52.

It should be readily apparent that the lubricating oil that passes upwardly around one of the studs 15 will be delivered by the cross-drilled passageways 48 and 51 to the cylinder head bores 11 and 12 associated with the cam shafts 35. This oil can then enter the access holes 41 and flow axially along the respective cam shafts 35 through the lubricating passageways 47. The lubricate will be discharged through the access holes 41 of the various cam shaft bearing portions 39 so as to lubricate these portions as well as the associated bearing surfaces of the cylinder head portions 36 and bearing caps 37. Lubricant can be returned to the crankcase 14 through any suitable return passage. For example, a return passage arrangement similar to the delivery passage arrangement may be provided at the opposite end of the cam shafts 35. In addition, if desired, the cam lobes may be drilled so as to permit oil to flow from the passages 47 to lubricate the valve mechanism.

Figure 1:
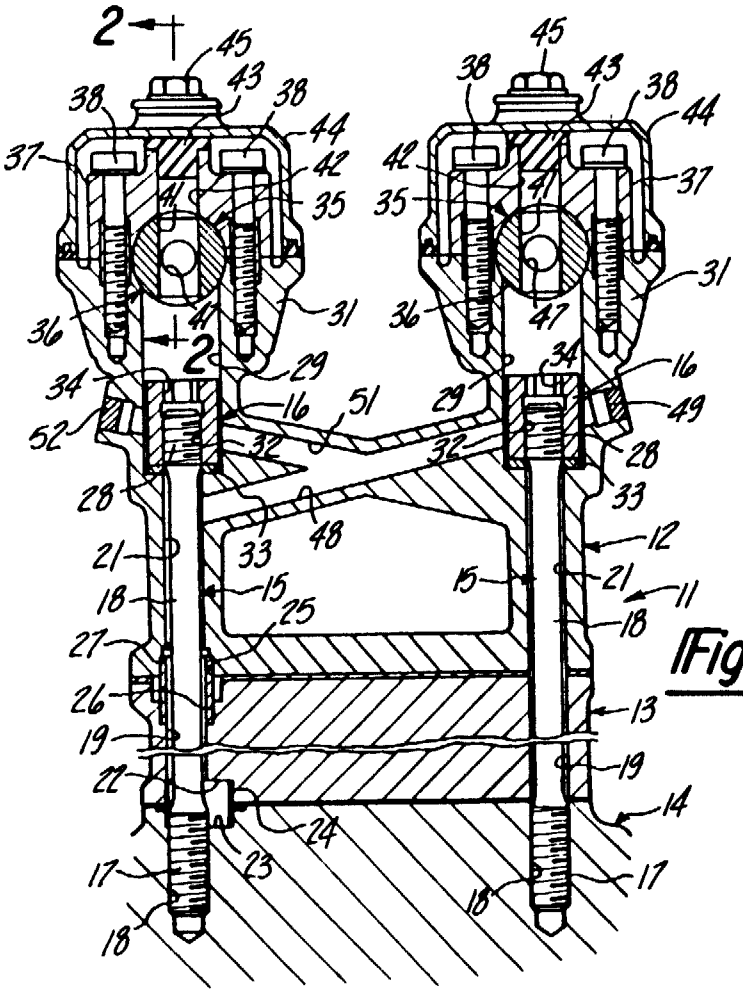
FIG. 1 is a cross-sectional view taken through one end of an internal combustion engine constructed in accordance with an embodiment of the invention about a plane perpendicular to the axis of rotation of the engine crankshaft.

It is believed readily apparent that the construction described will offer ease of servicing of the engine 11 without necessitating removal of the cam shafts 35. If retorqueing of the cylinder head nuts 16 is desired, the cam shaft covers 44 need only be removed along with the plugs 43 so as to afford access to the bearing cap bores 42. The cam shafts 35 are then rotated so that their access holes 41 will be vertically disposed as shown in FIG. 1 to afford access to the nut socket openings 34. Rotation of the cam shafts 35 may be accomplished by turning the crankshaft (not shown) of the engine directly. Alternatively, rotation may be accomplished by rotating either or both of the cam shafts 35. For this purpose, each cam shaft 35 is provided with an exposed hexagonal section 53 at a point between the bearing caps 37. By applying a suitable tool to the hexagonal section 53, the cam shafts 35 may readily be rotated so as to line up the access holes 41 with the nuts socket openings 34. A suitable wrench may then be inserted through the bores 42, access holes 41 and bores 29 so as to permit tightening of the nuts 15. In addition to permitting this servicing, the access holes 41 may be used to achieve lubrication of the valve train, as aforedescribed.

In the illustrated embodiment the cam shaft access holes 41 were located in the bearing portions 39 of the cam shafts 35. Of course, the invention is equally as useful in conjunction with an arrangement wherein the access holes 41 are positioned at a location other than in the bearing portions of the cam shafts 35. This location will, of course, depend on the location of the studs 15 and nuts 16 since the access holes 41 are located above the nuts 16. The described construction permits the optimum location of the cam shafts 35 relative to the cylinder bores and permits the cam shafts 35 to be placed directly above the studs 15 and nuts 16. It should also be understood that, although an arrangement has been disclosed wherein the studs 15 are threaded into the crankcase 14, the invention may be used in conjunction with an arrangement wherein the studs are threaded into the cylinder block. In a like manner, the invention can be used in conjunction with engines in which bolts rather than studs and nuts are used for affixing the cylinder head to the cylinder block. Various other changes and modifications may be made without departing from the spirit and scope of the invention, as defined by the appended claims.

We claim:

1. In a construction for an overhead cam internal combustion engine comprising a cylinder head adapted to be affixed to another component of the engine by at least one fastener, the improvement comprising a cam shaft journaled for rotation relative to said cylinder head, said cam shaft being positioned in overlying relationship to said fastener and means defining an access opening passing through said cam shaft and adapted to pass a tool for tightening said fastener without removal of said cam shaft.

2. A construction for an overhead cam internal combustion engine as set forth in claim 1 wherein the cam shaft is rotatably journaled by the cylinder head.

3. A construction for an overhead cam internal combustion engine as set forth in claim 2 wherein the access opening passes through an area of the cam shaft where said cam shaft is journaled by the cylinder head.

4. A construction for an overhead cam internal combustion engine as set forth in claim 3 further including means for delivering lubricant to the access opening for lubricating the cam shaft journal.

5. A construction for an overhead cam internal combustion engine as set forth in claim 1 further including means formed on the cam shaft for facilitating rotation of the cam shaft to align the access opening with the fastener.

6. A construction for an overhead cam internal combustion engine as set forth in claim 5 wherein the means for facilitating turning of the cam shaft comprises a hexagonal portion formed on the cam shaft.

7. A construction for an overhead cam internal combustion engine as set forth in claim 1 wherein there are a pair of cam shafts positioned on opposite sides of the cylinder head and fastening means positioned beneath each of the cam shafts, each cam shaft having an access opening adapted to pass a tool for tightening the fastener without removal of the respective cam shaft.

8. A construction for an overhead cam internal combustion engine as set forth in claim 7 wherein the cam shafts are rotatably journaled by the cylinder head.

9. A construction for an overhead cam internal combustion engine as set forth in claim 8 wherein the access openings pass through an area of the cam shafts where said cam shafts are journaled by the cylinder head.

10. A construction for an overhead cam internal combustion engine as set forth in claim 9 further including means for delivering lubricant to the access openings for lubricating the cam shaft journals.

11. A construction for an overhead cam internal combustion engine as set forth in claim 10, further including means formed on at least one of the cam shafts for facilitating rotation of the cam shafts to align the access openings with the fasteners.

12. A construction for an overhead cam internal combustion engine as set forth in claim 11 wherein the means for facilitating turning of the cam shaft comprises a hexagonal portion formed on the cam shaft.

13. A construction for an overhead cam internal combustion engine as set forth in any of the preceding claims wherein the fastening means comprises a threaded fastener.

14. A construction for an overhead cam internal combustion engine as set forth in claim 13 wherein the threaded fastener has a socket opening adapted to receive the tool.

15. A construction for an overhead cam internal combustion engine as set forth in claim 1 wherein there are a plurality of longitudinally spaced fasteners and the cam shaft has access openings associated with each of the fasteners, the cam shaft being rotatably supported by the cylinder head through bearing portions juxtaposed to the respective of the fasteners, the cam shaft having a longitudinally extending lubricating passage intersecting the access openings and further including means for delivering lubricant to said lubricant passage for lubricating the cam shaft bearing portion through the access openings.

*16. A construction for an overhead cam internal combustion engine as set forth in claim 3 wherein the cam shaft is journaled by means of a bearing cap affixed to the cylinder head and an access opening is formed in the bearing cap aligned with the access opening in the cam shaft for passing the tool for tightening the fastener.*

*17. A construction for an overhead cam internal combustion engine as set forth in claim 16 further including closure means for closing the access opening in the bearing cap.*

*18. A construction for an overhead cam internal combustion engine as set forth in claim 17 further including a cam cover affixed to the cylinder head and enclosing the cam shaft, the cam cover having a portion thereof engaging the closure and holding the closure in the bearing cap access opening.*

*19. A construction for an overhead cam internal combustion engine as set forth in claim 9 wherein the cam shafts are journaled by the cylinder head by means including bearing caps affixed to the cylinder head, each of the bearing caps having an access opening aligned with the respective cam shaft access opening for passing the tool for tightening the fastener.*

*20. A construction for an overhead cam internal combustion engine as set forth in claim 19 further including closure means received in the bearing cap access openings for closing the bearing cap access openings.*

*21. A construction for an overhead cam internal combustion engine as set forth in claim 20 further including a cam cover affixed to the cylinder head and enclosing the cam shafts, the cam cover having means engaging the closures for maintaining the closures in the bearing cap access openings.*

*22. In a construction for an overhead cam internal combustion engine comprising a cylinder head adapted to be affixed to another component of the engine by at least one fastener having a tool receiving portion for tightening thereof and having a bearing cap affixed to the cylinder head and rotatably journaling the overhead camshaft, the improvement comprising said bearing cap having a portion overlying said fastener tool receiving portion, and means defining an access opening passing through said bearing cap and adapted to pass a tool for tightening of said fastener without removal of said bearing cap.*

*23. A construction for an overhead cam internal combustion engine as set forth in claim 22 further including closure means for closing the access opening in the bearing cap.*

*24. A construction for an overhead cam internal combustion engine as set forth in claim 23 further including a cam shaft cover affixed to the cylinder head and enclosing the cam shaft and bearing cap.*

*25. A construction for an overhead cam internal combustion engine as set forth in claim 24 wherein the cam cover has a surface engaged with the closure for retaining the closure in the bearing cap access opening.*

*26. A construction for an overhead cam internal combustion engine as set forth in claim 22 wherein the cylinder head is affixed to a cylinder block.*

*27. A construction for an overhead cam internal combustion engine as set forth in claim 26 wherein the cylinder head is affixed to the cylinder block by fastening means formed on opposite sides of the cylinder block, the cam shaft being positioned over one series of the fastening means at one side of the cylinder block and further including a further cam shaft positioned on the other side of the cylinder block and overlying the other series of fastener means, said other cam shaft being rotatably journaled by bearing caps having portions overlying the other series of fastener means and having access openings passing therethrough and adapted to pass a tool for tightening the second series of fastener means without removal of the bearing cap.*

*28. A construction for an overhead cam internal combustion engine as set forth in claim 27 wherein the cam shafts are further rotatably journaled by bearing surfaces formed directly in the cylinder head.*

*29. A construction for an overhead cam internal combustion engine as set forth in claim 28 further including closure means received in the bearing cap access openings for closing said access openings.*

*30. A construction for an overhead cam internal combustion engine as set forth in claim 29 further including cam cover means affixed to the cylinder head and overlying and enclosing the cam shafts and the bearing caps.*

*31. A construction for an overhead cam internal combustion engine as set forth in claim 30 wherein the cam cover means has surfaces engaged with the closures for retaining the closures in the cam shaft bearing cap access openings.*

* * * * *